INVENTORS
David J. Boes, W. Dwight Johnston
and Lawrence E. Moberly

United States Patent Office 3,303,370
Patented Feb. 7, 1967

3,303,370
ELECTRICALLY CONDUCTIVE SOLID LUBRICANT MEMBERS AND PROCESS AND APPARATUS EMPLOYING THEM
David J. Boes, Monroeville, and W Dwight Johnston and Lawrence E. Moberly, Penn Hills, Pa., assignors to Westinghouse Electric Corporation, East Pittsburgh, Pa., a corporation of Pennsylvania
Filed Nov. 4, 1963, Ser. No. 321,312
5 Claims. (Cl. 310—228)

This invention relates to solid members possessing both good lubricating and good electrical conducting properties and to methods and to apparatus both electrical and mechanical, employing the same.

The use of solid materials as lubricants is becoming increasingly important as the operating conditions of various systems requiring lubrication exceed those at which organic or semi-organic liquid lubricants are stable and reliable. The current activity in space exploration has spurred the search for lubricants which can withstand ultra high vacuum environments or high radiation levels without excessive evaporation or deterioration of lubricating properties.

One of the materials frequently used as such a solid lubricant is graphite. It has proven ability to reduce friction and wear of metal surfaces in sliding contact with one another at elevated temperatures. However, one serious drawback to its use as a solid lubricant is its inability to reduce friction and wear in the absence of water vapor, a condition which exists in high altitude and outer space environments. A second group of compounds which has shown good anti-wear and friction properties is molybdenum disulfide and related compounds. Although not quite as stable from an oxidation standpoint as graphite, these compounds remain unaffected, from a lubrication standpoint, by the absence of water vapor.

A particularly troublesome problem area has been found to exist in electrical sliding contacts, such as electric brushes in dynamoelectrical machines, such as motors and generators, where both good electrical conductivity and some high degree of lubrication are required. In most common applications, brushes comprising ordinary carbon or graphite or both are quite adequate. However, in high altitude or space applications such brushes may disintegrate in an hour or less, and must be furnished with some additional lubricating means. One such method has been the incorporation in carbon brushes, by diverse schemes, of effective quantities of solid lubricants of the molybdenum disulfide type. These solid lubricants include most of the disulfides, diselenides and ditellurides of molybdenum, titanium, tungsten and zirconium. While these solid lubricant additives have provided adequate brush lubrication, they, because of their high electrical resistance, present additional problems by way of erratic and high brush-commutator contact resistance which often renders proper operation of dynamo-electric machines difficult.

Thus there has developed somewhat of a dilemma in electrical sliding contact design for space and other severe applications in that a proper balance between lubricating effectiveness and minimum electrical losses must be achieved.

Accordingly, it is a primary object of the present invention to provide for improved self-lubricating electrical sliding contacts of such quality as to minimize electrical losses and contact resistance, the contact being suitable for use in low pressure or vacuum, and low oxygen applications over a wide range of temperatures.

Another object of the invention is to provide solid lubricant members possessing good electrical conductivity and being highly useful in bearings and other mechanical devices requiring good lubrication.

Another object of the invention is to provide, in dynamoelectric machines, improved self-lubricating sliding electrical contact members characterized by minimum contact resistance losses, the contacts being suitable for low pressure or vacuum, and low oxygen applications over a wide range of temperatures.

Another object is to provide a method for lubricating surfaces in movable contact with one another by disposing therebetween a selected solid lubricant, alone or in combination with fluid vehicles or suspension media.

Another object is to provide a method for lubricating surfaces in movable contact with one another by disposing at least at one such surface a bonded lubricating layer or film comprising a selected solid lubricant and a resin or metal binder.

Another object is to provide a method for improving anti-friction properties of a member subject to mechanical friction by applying at least to the friction subjected face thereof, a selected solid lubricant alone or in combination with resin or metal binders or in combination with fluid vehicles or suspension media.

Another object of the invention is to provide for articles of manufacture comprising members suitable for relative movement with respect to other members with low friction therebetween, the members exhibiting at least at the contacting faces thereof a lubricating film comprising a selected solid lubricant alone or in combination with plastic resin or metal binders or in combination with fluid vehicles or suspension media.

These and other objects of the invention will become apparent from the following detailed description when taken in conjunction with the accompanying drawings, in which.

Basically, the present invention relates to the novel application of niobium diselenide possessing the highly unusual combination of both good anti-friction and good electrical conducting properties.

It has been found that this compound, niobium diselenide, exhibits a remarkable combination of characteristics. Its lubricating or anti-friction properties are generally superior to both graphite and such solid lubricants as molybdenum disulfide while its electrical conductivity properties are substantially equivalent to graphite. Niobium diselenide is stable from an oxidation standpoint up to temperatures of 350° C. to 400° C. in air and is thermally stable in a neutral or non-oxidizing gas or under high vacuum up to 1000° C. Because of these properties, it may be used as a lubricant throughout a relatively wide temperature range under a variety of atmospheres or vacua.

Niobium diselenide always has an unpaired electron per molecule which accounts for its good conductivity characteristics. The electrical resistivity of niobium diselenide is only $.535 \times 10^{-3}$ ohm cm. as compared to $1.4 \times 10^{-3}$ ohm cm. for graphite. A comparison of the lubricating properties and electrical resistivity of niobium diselenide, molybdenum disulfide and graphite is illustrated in Table I.

TABLE I

| Compound | Resistivity, ohm-cm. | Friction coefficient at 80 p.s.i. | | |
|---|---|---|---|---|
| | | 7 f.p.m. | 35 f.p.m. | 70 f.p.m. |
| C (graphite) | $1.4 \times 10^{-3}$ | .13 | .14 | .16 |
| $MoS_2$ | 851 | .23 | .21 | .17 |
| $NbSe_2$ | $.535 \times 10^{-3}$ | .13 | .12 | .12 |

The coefficients of friction were determined by pressing a rotating button of the respective lubricant against a stainless steel disk at 25° C. in air.

Table I compares the friction coefficient at 80 p.s.i. pressure between sliding surfaces for speeds of 7, 35 and 70 feet per minute. It should be noted in this respect that the friction coefficient values for niobium diselenide in Table I apply to the annealed condition. This annealing is described hereinafter.

The advantages of niobium diselenide both from the standpoint of electrical resistivity and lubrication are obvious in viewing Table I. This unexpected combination of properties makes niobium diselenide highly useful as a lubricant in sliding electrical contacts such as electrical brushes.

Figure 1:
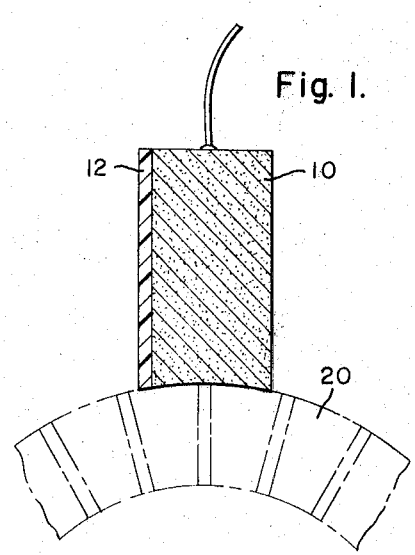
FIGURE 1 is an elevation, in cross-section, of a self-lubricated electrical contact brush.
Figure 2:
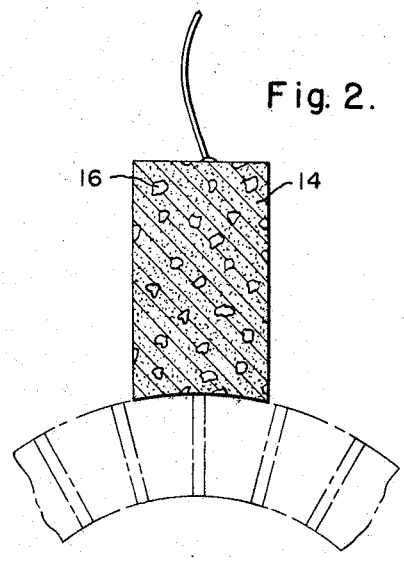
FIG. 2 is an elevation, in cross-section, of a self-lubricated electrical contact brush.

Carbon or graphite electrical sliding brushes particularly suitable for use in high altitude or space applications have incorporated therein effective amounts, generally about from 5% to 20% of the total weight of the brush, of the niobium diselenide. As the lubricating ability of graphite is diminished at low partial pressures of oxygen and in the absence of water vapor, the niobium diselenide enables low friction between the brush and a commutator. Suitable methods of such solid lubricant incorporation are illustrated in FIGS. 1 and 2 which, respectively, illustrate (1) an electrical graphite brush 10 with a face 12 comprising a layer of niobium diselenide and (2) another electrical graphite brush 14 with particles of niobium diselenide such as indicated by the numeral 16, distributed throughout the brush body, both operating against a commutator 20. Where with molybdenum disulfide the particle size should be large, where low contact resistance is desired, nobium diselenide may be used in any particle size.

Niobium diselenide may be present in any reasonable amount without seriously jeopardizing the integrity of an electrical sliding contact or brush. The commutator 20 in FIG. 1 may be a slip ring. It may be of copper, copper base alloy, or of silver. Alternatively, a copper contact similar to brush 10 may be pressed against a commutator or slip ring comprising graphite or copper or silver with niobium diselenide.

While as little as ½% of niobium diselenide is usefully added to carbon brushes, larger amounts of the order of 5% and more may be present for best results in high vacuum conditions. For example, a brush of essentially pure niobium diselenide has been tested and was found to be operative. However, this brush, without the hereinafter described heat treatment or annealing, tended to film the commutator excessively. With the annealing described hereinafter, this problem is essentially eliminated. Since most, if not all, sliding contacts or brushes will contain substantially less than 100% niobium diselenide, a substantial proportion being graphite or a carbonaceous binder this filming is not a problem. Thus, while any amount of niobium diselenide will be of benefit as a lubricant in a sliding electrical contact, for very high altitude or vacuum applications, a preferred minimum of niobium diselenide composition in a carbon contact such as a carbon brush is about 5% based on the total weight of the contact. Generally speaking, preferred composition ranges of a carbon brush would be about 5% to 35% of niobium diselenide with an optimal composition range being about 10% to 20% based on the weight of the entire contact or brush. The term "carbon" as applied herein to a contact or brush is to be construed to apply to carbon or graphite or mixtures thereof, and may include powdered metal such as copper.

The above-mentioned niobium diselenide composition ranges for carbon electrical contacts or brushes also apply to non-carbon contact members. For example, sliding electrical contacts of metals such as silver, gold, copper, platinum and their alloys may be effectively lubricated by the incorporation therein of niobium diselenide in the amounts disclosed above for the carbon contacts. These non-carbon contacts offer great promise in certain highly critical space applications where it is desired to pass a high electrical current through a sliding electrical contact with the minimum contact resistance.

Another advantage afforded by the electrical conductivity and low friction properties of niobium diselenide in electrical apparatus appears in certain applications where it is desired to effectively ground a rotating shaft, such as an A.C. rotor shaft. This shaft could be effectively grounded through a bearing lubricated with niobium diselenide which, because of its conductivity, will permit effective grounding of the rotating shaft through the bearing support while maintaining good anti-friction properties.

It is preferred that any niobium diselenide to be used as a lubricant in accordance with the invention be treated to remove any free selenium. However, this may vary with the particular application. When niobium diselenide is synthesized by reacting stoichiometric proportions of niobium and selenium, it has been found that there is almost invariably present in the compound a small amount of free selenium. By heating the niobium diselenide to a temperature in excess of the vaporization temperature for selenium while subjecting it to a vacuum any free selenium is removed. For example, a quantity of niobium diselenide may be heated to about 400° C. and higher at a vacuum level of about 5 millimeters of mercury absolute pressure or less with some means for condensing the liberated selenium vapor. While the presence of a slight excess of selenium is generally not detrimental to the use of niobium diselenide in relatively non-critical applications such as most common carbon brush applications, its presence would seriously hinder incorporation of niobium diselenide into a brush bearing or other member by methods such as sintering. For example, in the incorporation of untreated niobium diselenide into a powdered silver compact followed by sintering, the presence of excessive selenium which would vaporize at the sintering temperatures of silver would tend to form gas pockets in the member or, further, may react or alloy with the other constituents of the member thereby seriously impairing its conductivity and integrity. Heat treatment of the niobium diselenide avoids these problems.

While presenting outstanding advantages in sliding electrical contacts, the good lubricating qualities of niobium diselenide will enable good results in other applications. Since niobium diselenide as a lubricant is generally speaking, equal to or better than known solid lubricants such as molybdenum disulfide, its use in various applications requiring lubrication is immediately apparent. Under high loads or high speeds or both, ordinary niobium diselenide often tends to film excessively. The building of excessive films of the niobium diselenide may be undesirable in certain applications because of its tendency to increase the coefficient of friction. This excessive filming tendency may be alleviated by a heat treatment or annealing process of the niobium diselenide.

Niobium diselenide is normally synthesized by reacting stoichiometric amounts of powdered niobium and selenium in an evacuated, sealed silica vessel at about 450° C. The temperature is then increased to 750° C. and held at this temperature for at least 15 hours to ensure the completeness of the reaction. Niobium diselenide synthesized in this or a similar fashion when used as a lubricant will generally exhibit heavy filming tendencies under high loading or high speeds which films may, in some instances, be undesirable. This filming tendency is alleviated by exposing the compound to a further heat treatment of at least 900° C., the upper temperature limit not exceeding the thermal decomposition temperature at the conditions involved, for a period of hours, for example 4 to 6 hours or longer at 1000° C., in the absence of a reactive gas, for example in a vacuum or in argon. This treatment results in the material assuming a highly crystalline appearance. The advantages of this high temperature heat treatment are best illustrated by reference to Table II wherein is tabulated the friction coefficients of ordinary versus high temperature heat treated niobium diselenide at loads of 80 p.s.i. and 170 p.s.i. and at speeds of 7, 35 and 70 feet per minute. Friction coefficients under such conditions are listed after both one minute and ten minutes of testing.

TABLE II.—COMPARISON OF FRICTION COEFFICIENTS OF ANNEALED AND UNANNEALED $NbSe_2$

| Operating Conditions | | Unheat Treated After— | | Heat Treated (1,000° C.) After— | |
|---|---|---|---|---|---|
| Load p.s.i. | Speed, f.p.m. | 1 min. | 10 min. | 1 min. | 10 min. |
| 80 | 7 | .12 | .12 | .13 | .13 |
| 80 | 35 | .12 | .23 | .121 | .121 |
| 80 | 70 | .15 | .20 | .091 | .125 |
| 170 | 7 | .11 | .14 | .168 | .168 |
| 170 | 35 | .12 | .23 | .158 | .132 |
| 170 | 70 | .17 | .27 | .122 | .115 |

As can be seen in Table II there is a marked improvement in the annealed over the unannealed specimens with respect to friction coefficients. This is attributable to the fact that the heavy filming tendency of the unannealed specimens is alleviated by the heat treatment. Thus, where it is desired to lubricate under high loads or high speeds, or both, or where it is desirable to use a composition rich in niobium diselenide, for example 30% or more niobium diselenide, it is preferable to heat treat the niobium diselenide as described above. If however the application is one of low stress, such as an electrical brush generally containing somewhat less than 10% by weight of niobium diselenide, the unannealed compound is generally as satisfactory as the annealed niobium diselenide.

However, as indicated hereinbefore, where a metal-niobium diselenide member is to be formed by a sintering or similar operation, it is always preferable to subject the niobium diselenide to the above heat treatment to remove any excessive selenium.

For a better understanding of the application and scope of the invention, reference should be made to the following examples which are illustrative embodiments of the practice of the invention.

*Example I*

A carbon brush is formed by combining in relatively small particle sizes (in the order of 40 microns) carbon, either graphite or ordinary carbon or mixtures of both as desired, with about 15%, based on the weight of the brush, of niobium diselenide and about 25% by weight, based on the weight of the dry carbon and niobium diselenide powder, of a resin binder such as, a phenolic resin, thoroughly admixing the ingredients and compressing at about 1000 p.s.i. pressure at about 100° C. to 200° C. for about ½ hour into a body. The body is baked in a non-oxidizing atmosphere at 800° C. for four hours. The resulting brush will be self-lubricating and exhibit very low contact resistance and, further, be suitable for high altitude or even vacuum applications.

By methods well known in the art, substantial amounts, even up to 50% or more by weight of certain additives, such as metal halides for example lead iodide, are often incorporated into carbon brushes to impart certain desired properties. Such additives may be incorporated into the carbon brush formed in Example I by a post treatment. However, with the carbon brushes of this invention, generally speaking smaller quantities of such additives are used or they may be entirely eliminated.

*Example II*

An electrical contact brush is formed by thoroughly admixing in relatively small particle sizes (of the order of 40 microns) about 15%, based on the weight of the brush of niobium diselenide and the balance comprising chiefly silver, then cold pressing the mixture at about 50,000 p.s.i. pressure at 100° C. and finally sintering the resulting compact at about 750° C. for 6 hours in an inert atmosphere or vacuum. The resulting brush will exhibit unusually high electrical conductivity since silver is a superior conductor when compared to carbon and will exhibit excellent self-lubricating characteristics. The niobium diselenide used in forming the silver brush is first treated so as to remove any excess selenium by heating it to about 400° C. in a vacuum of about 5 millimeters of mercury absolute pressure, so as to preclude any bloating of the sintered silver.

*Example III*

Figure 3:
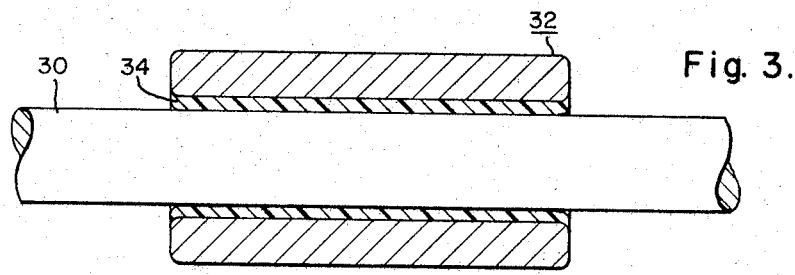

A sleeve bearing is lubricated by the practice of the invention as follows. Referring to FIG. 3, shaft 30 rotates in a sleeve bearing 32. Disposed in sleeve 32 is a bearing liner 34 of a composite containing an effective amount, for example about 25% by weight, of niobium diselenide in a resin (e.g. phenolic resin) or sintered metal binder. The bearing will not require any external lubricant. In order to effectively ground the said shaft 30 through bearing 32, as for example if 30 were the rotor shaft in an A.C. electric motor, the bearing 32 could be constructed of a conductive material such as bronze in which is incorporated by weight about 25% of niobium diselenide, either throughout the entire bearing or in merely a bearing liner 34, if present. This lubricant incorporation would be accomplished by sintering the thoroughly admixed and compacted bronze and niobium diselenide powders for about 6 hours at 800° C.

*Example IV*

Figure 4:
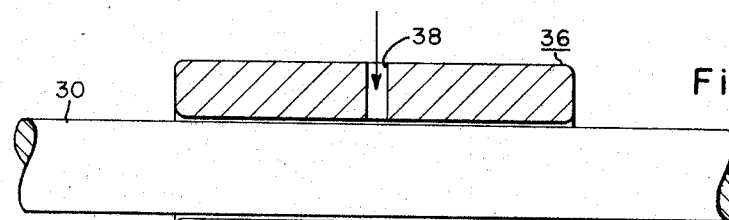
FIGS. 3 to 5 are elevations, partly in cross-section, of an embodiment of the invention in bearings.

Referring to FIG. 4, there is illustrated another bearing structure comprising a shaft 30 rotating in a sleeve type bearing 36 provided with a lubricating aperture 38. Into the apertures 38 in the sleeve bearing 32, there is introduced an effective quantity of niobium diselenide suspended in oil, water, or any other suitable medium, depending on the particular application.

If a rotating shaft has an area along its length supported by a bearing which is subjected to friction, this area is coated with niobium diselenide to improve its anti-frictional properties. The area in frictional contact may be treated by the application of niobium diselenide to this surface as by rubbing, dipping or otherwise introducing it, in order to improve its anti-frictional qualities especially during periods of break-in.

*Example V*

Figure 5:
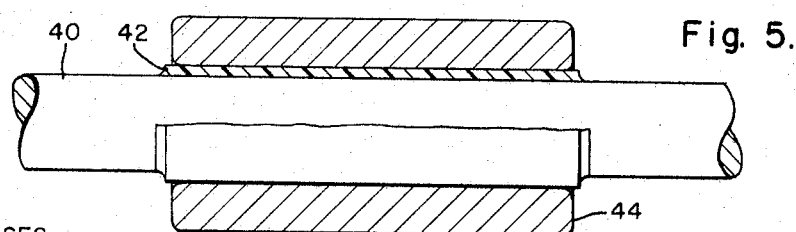

The niobium diselenide is incorporated in a bearing by the application to the surface of the rotating shaft of a bonded layer embodying the niobium diselenide as is illustrated in FIG. 5 wherein shaft 40 is rotating within and supported by sleeve bearing 44. A layer 42 comprising about 20% niobium diselenide in a resin binder is bonded to the shaft 40.

*Example VI*

Self-lubricating copper communtator bars or copper slip rings containing niobium diselenide for use in dynamo-electric machines may be formed by mixing small particles in amounts of about 4% by weight of niobium diselenide with the balance essentially comprising silver bearing copper, cold pressing the composite under about 25,000 p.s.i. to 50,000 p.s.i. pressure at about 150° C. and then sintering the compact at about 850° C. to 900° C. in a nonreactive gas or vacuum for about 4 or 5 hours. The resulting member may then be machined into commutator bars or slip rings which will possess self-lubricating properties in contact with carbon brushes without serious impairment of electrical conductivity qualities. Similar members could be formed using other metals and materials, for example silver.

In members subject to mechanical friction, such as the bearing applications illustrated in FIGS. 3, 4 and 5, in a preferred composition for the bearing components, the range for the niobium diselenide is from about 15% to 30% of the total weight of the member. However, it should be noted that the preferable or the optimum composition will vary with the application. For example where the niobium diselenide lubricant is incorporated into a resin which itself offers some lubrication characteristics, such as polytetrafluoroethylene, considerably less is incorporated than where the binder is a phenolic resin or sintered metal which offers no substantial lubrication.

It is to be understood that while FIGS. 3 and 4 describe the application of the invention with particular reference to sleeve bearings, the invention is not to be so limited.

The invention will find use in any application where it is desired to reduce friction between surfaces in movable contact with one another. Such applications include ball or roller bearings, gears, cams and many others.

Other solid lubricants may be added to or combined with the niobium diselenide. Thus graphite and molybdenum disulfide may be included or admixed with the niobium diselenide.

It is to be understood that the above description and drawings are illustrative and not in limitation of the invention or its application.

We claim as our invention:
1. An improved electrical brush for operating in sliding contact with a conducting surface, comprising a body of carbon and an effective quantity of at least ½% by weight of niobium diselenide applied thereto.
2. In a dynamoelectric machine, a metallic current collector, a carbon brush disposed in sliding contact with the metallic current collector the carbon brush comprising an effective quantity of at least ½% by weight of niobium diselenide incorporated therein.
3. An electrical contact member for operating in sliding contact with a conducting surface, the contact member comprising a body of a highly electrically conductive material selected from at least one of the group consisting of carbon and the metals silver, gold, copper and their alloys and an effective quantity comprising at least ½% by weight of niobium diselenide applied thereto.
4. The electrical contact member of claim 3 wherein the contact member body is of at least one metal selected from the group consisting of silver, gold, copper and their alloys.
5. The electrical contact member of claim 3 wherein the contact member body is of carbon and from 5% to 35% by weight of finely divided niobium diselenide distributed throughout the carbon body.

References Cited by the Examiner
UNITED STATES PATENTS

| | | | |
|---|---|---|---|
| 2,589,582 | 3/1952 | Strughold | 252—12 |
| 2,780,743 | 2/1957 | Elsey | 310—251 X |
| 2,854,597 | 9/1958 | Foote et al. | 310—228 |
| 2,946,907 | 7/1960 | Titus | 310—228 |
| 3,014,865 | 12/1961 | Seniff | 252—12 |
| 3,042,822 | 7/1962 | Savage et al. | 310—228 |

MILTON O. HIRSHFIELD, *Primary Examiner.*

D. F. DUGGAN, *Assistant Examiner.*